United States Patent

[11] 3,602,643

[72] Inventor Joseph E. Wright, Jr.
Wheaton, Ill.

[21] Appl. No. 792,727
[22] Filed Jan. 21, 1969
[45] Patented Aug. 31, 1971
[73] Assignee Walter E. Heller & Company
Chicago, Ill.

[54] SCAN CONTROL APPARATUS FOR VALIDATION DEVICE
18 Claims, 8 Drawing Figs.

[52] U.S. Cl. .......... 178/7.6, 209/111.7, 209/DIG. 2, 250/219 DQ, 340/149 A, 356/71
[51] Int. Cl. .......... G01n 21/22, G06k 9/13, G07d 7/00
[50] Field of Search .......... 178/7.1, 7.6; 179/2 CA; 250/219 DOC; 340/149 A; 356/71; 209/111.7, DIG. 2

[56] References Cited
UNITED STATES PATENTS

| | | | |
|---|---|---|---|
| 3,031,076 | 4/1962 | Claris | 250/219 DOC |
| 3,275,138 | 9/1966 | Cahill | 356/71 |
| 3,356,992 | 12/1967 | Ptacek | 340/149 A |
| 3,462,225 | 8/1969 | Bayha | 356/71 |

*Primary Examiner*—Bernard Konick
*Assistant Examiner*—Howard W. Britton
*Attorneys*—Ronald L. Engel, Daniel W. Vittum, Jr. and Gomer W. Walters

ABSTRACT: Document validation apparatus includes apparatus for controlling the rate of scan in a machine designed to perform an authentication test on a text document by moving a scanning means across at least a portion of the document. The control apparatus comprises a spring cable of driving the scanning means across a test area and a dashpot arrangement designed to control the rate at which the scanning means is driven. A switch device prevents interference with the authentication test due to mechanical shock, and an additional switch device prevents interference with the authentication test by spurious electrical signals by rendering the test apparatus inoperative except during the brief time interval when the document is scanned.

INVENTOR.
JOSEPH E. WRIGHT, JR.
BY Daniel W. Sixbey Jr.

PATENTED AUG 3 1 1971 3,602,643

INVENTOR.
JOSEPH E. WRIGHT, JR.

BY Daniel W. Vittum Jr.

ATTY.

INVENTOR.
JOSEPH E. WRIGHT, JR.

BY Daniel W. Vittum Jr.

SCAN CONTROL APPARATUS FOR VALIDATION DEVICE

BACKGROUND OF THE INVENTION

1. Field of the Invention

This invention relates generally to a device for validating paper documents, such as paper money, and more specifically to scan control apparatus designed for use in a device adapted to optically and/or magnetically scan a paper security in order to determine the authenticity thereof.

2. Description of the Prior Art

As is well known in the validator arts, a number of paper document validators now commercially available are designed to carry out tests which measure the texture a nd relative placement of imprinting on such a security. Generally a scanning head is provided which uses either optical or magnetic means for producing a signal which corresponds to the thickness or spacing of the imprinting on the test document by scanning a portion thereof. The signal derived from the scanning operation is then evaluated by an electronic circuit which measures its frequency, amplitude, or DC level (or some combination of these parameters). If the signal from the test document corresponds with the signal that would be produced by a genuine document, the test document is accepted. Conversely, if the signal from the test document is accepted. Conversely, if the signal from the test document varies significantly from the signal that would be produced by a genuine document, the test bill is rejected.

If the frequency of the test signal (which typically depends on the rate at which relative movement between the scanning head and the test document occurs) is to be useful in distinguishing a genuine document from one that is counterfeit, it is apparent that the validator must be designed so that the rate of scan of all documents is uniform, that is, only if the rate of scan of each test document is uniform can the electronic circuit associated therewith determine if the imprinting on the test document corresponds to that found on a genuine document. For example, a counterfeit document with lines spaced more widely than a genuine document may nonetheless produce a scan signal identical in frequency to a genuine scan signal if the widely spaced lines in the counterfeit document are scanned more rapidly than the lines on a genuine document.

If the scan mechanism is used in a document validator in which the test document can remain under the control of the operator during the test operation, it is relatively easy to design a device which will provide a uniform scan rate during the scan cycle of operation. However, if the validator is used in a vending machine, the design of an apparatus providing uniform scan rate is more difficult to achieve since the test cycle of operation must be keyed to the operation of means adapted to isolate the test document from the operator in order to prevent the theft thereof before the scan phase of operation is begun. Moreover, vending machine type validators must be unusually reliable and yet inexpensive to produce while at the same time accurate and rapid in operation. While previous validators have used different types of apparatus to provide a uniform scan rate, each has proved to be either too expensive and complicated or too unreliable and inaccurate for use in vending type devices.

One typical method of controlling the rate of scan is to provide either a motor, which moves the tray containing the test document at a uniform speed past a fixed scanning head, or a motor which drives the scan mechanism at a uniform rate past a stationary test document, or some combination thereof. While such a device provides a uniform scan rate for all documents, it is also bulky, expensive, and, due to its complexity, less reliable than such a mechanism should be.

One arrangement for scanning a test document comprises a mechanical linkage between a movable document tray and the scanning mechanism, whereby the scanning operation is accomplished simultaneously with the insertion of the tray into the test area. However, in previous systems of this kind, the rate of scan of the scanning mechanism has been directly proportional to the speed of the tray which is in turn determined by the speed at which the tray is manually inserted. Since the rate at which scanning occurs is generally not uniform in such a device, it is not possible to use the frequency of the resulting scan signal to determine the genuineness of a test document.

It should be apparent from the foregoing discussion that a simple, economical, and wholly mechanical means of regulating the scan rate of a document validator which initiates operation of the scan device only after a test document is inserted in a test area would be a great benefit to the validator and vending machine arts.

Accordingly, a primary object of the present invention is to provide a simple and economically produced paper security validator for scanning a test document at a mechanically uniform rate.

A related object of this invention is to provide a validator of the character described in which the rate of scanning is independent of the speed at which the document is inserted into the test area.

Another object of the present invention is to provide apparatus which initiates a validation test only after a test document has been removed from the control of the operator.

It is yet another object of the present invention to provide a scan rate control device in which the rate of scanning is readily adjustable to operate within a wide range of values.

If the validator is used in a vending machine application, the design of the apparatus must generally provide means for preventing the operator from introducing spurious signals to the validation test apparatus which may duplicate the electrical impulses present in a genuine scan signal. For example, if the operator would be able to introduce signals to the apparatus by manipulation of the test document or tray at points of time other than during the normal scanning operation, the chances of generating random electrical signals corresponding to genuine scan signals would be increased.

Accordingly, another important object of the present invention is to provide apparatus which prevents the validation of test signals except during a predetermined operating period.

Aside from manipulations designed to introduce spurious electrical signals to the test apparatus, an operator may try to "overpower" the validating device by means of mechanical shock. That is, an operator may try to advance the tray into the test area so rapidly that the shock generated by contact between the tray and a stop member will tend to produce impulses simulating genuine electrical signals. In applications in which control of the tray necessarily remains with the operator, such as vending machines, the risk of improper validation due to mechanical shock represents a severe limitation on the usefulness of the overall validating device. Although it is, of course, possible to devise elaborate and complex electronic means for preventing spurious signals generated by mechanical shock, such devices are normally too costly for vending machine applications.

Accordingly, it is an important object of the present invention to provide a wholly mechanical means for preventing operation of the validating device when the tray is advanced by the operator at a rate which would produce a mechanical shock, and which nonetheless allows completion of a validation test when the tray is advanced at a normal rate of speed.

SUMMARY OF THE INVENTION

In order to achieve these and other objects and advantages, the present invention, in its preferred embodiment, is basically directed to an improvement in a paper security validation device adapted to perform an authentication test on a test document comprising: document carrier means for moving the test document from a first position to a second position; scanning means movable between a first position and a second position in a first plane; cam follower means operatively associated with the scanning means; drive means adapted to cause the scanning means to move from its first to its second position at a uniform rate; first cam means adapted to coact with the cam follower means whereby the scanning means is normally maintained in its first position and is permitted to move from its first to its second position responsive to the carrier means reaching its second position; and second cam means adapted to coact with the cam follower means whereby movement of the carrier means from its second toward its first position causes the scanning means to move from its second toward its first position.

The present invention preferably also comprises switch means operatively associated with the scanning means whereby the validation apparatus is enabled only during the period of time when the scanning means is moved from it s first position to its second position in its first plane.

The invention preferably also includes additional switch means comprising: detent means carried by the document carrier means and having an engaged position and a disengaged position; releasable latch means carried by the document carrier means whereby the detent is normally held in it s engaged position; movable mass means positioned in the path of the detent means, whereby the detent means will be moved from its engaged to its disengaged position by contact with the mass means when the document carrier is moved from its first to its second position at a speed exceeding a predetermined rate; and resilient switch means adapted to disable the validation apparatus when the latch means is moved to its disengaged position by contact with the mass means.

An especially preferred form of the invention would further comprise control means for controlling the uniform rate at which the drive means causes the scanning means to move from its first to its second positions in its first plane. The scanning means is also preferably movable between first and second positions in a second plane, further cam and follower means being provided to effect movements in the second plane in accordance with a predetermined sequence responsive to movement of the document carrier means between its first and second positions. More specifically, a scanning head and a cam follower lever are mounted on a common shaft. Linear and rotational movement of the lever, and thus the scanning head, is controlled in accordance with a predetermined sequence by a cam assembly comprising a plurality of separate surfaces which are adapted to control the position of the lever in response to movement of the document-carrying means between inactive and test positions.

DESCRIPTION OF THE DRAWINGS

The above-mentioned objects, advantages, and features of the present invention will hereinafter appear, and, for purposes of illustration but not of limitation, an exemplary embodiment is illustrated in the accompanying drawings, in which like reference characters refer to like parts throughout and in which.

DESCRIPTION OF THE PREFERRED EMBODIMENT

Figure 2:
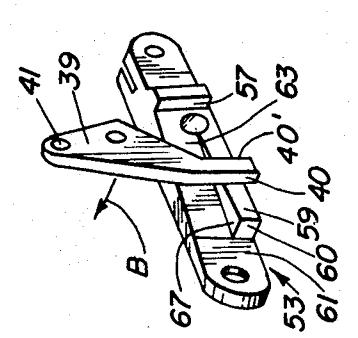
FIG. 2 is an enlarged, perspective view of the cam assembly and cam follower member shown in FIG. 1 during a particular phase of operation.

With reference to the drawings, a preferred form of a paper security validation device made in accordance with the present invention would include a document carrier such as a tray 5, a scanning assembly 18, a drive mechanism 26, a cam follower assembly 38, a cam assembly 53, a scanning switch assembly 70, and a tray switch assembly 100.

Figure 1:
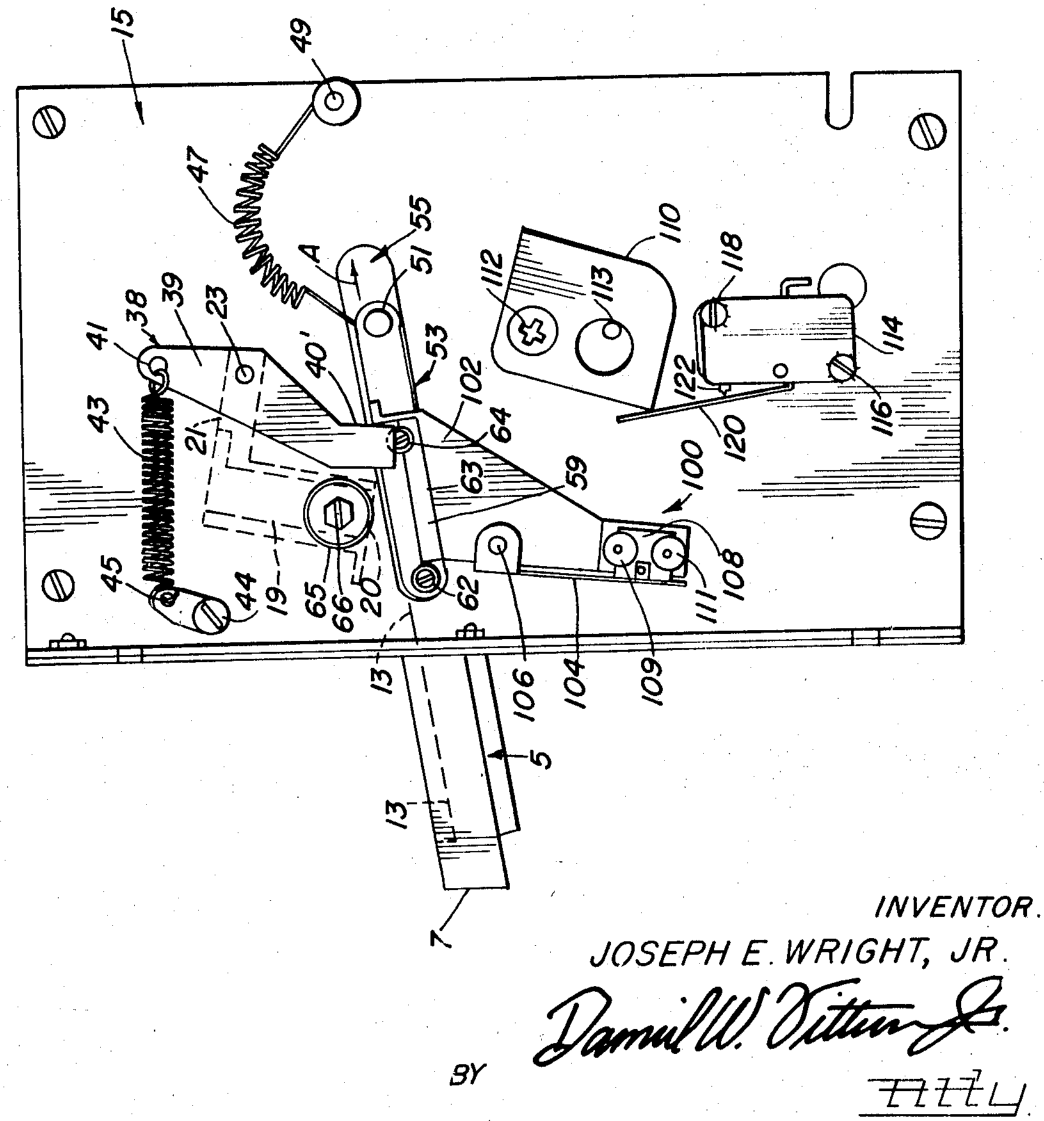
FIG. 1 is a side elevational view of a preferred form of a security validation device made in accordance with the requirements of the present invention.
Figure 6:
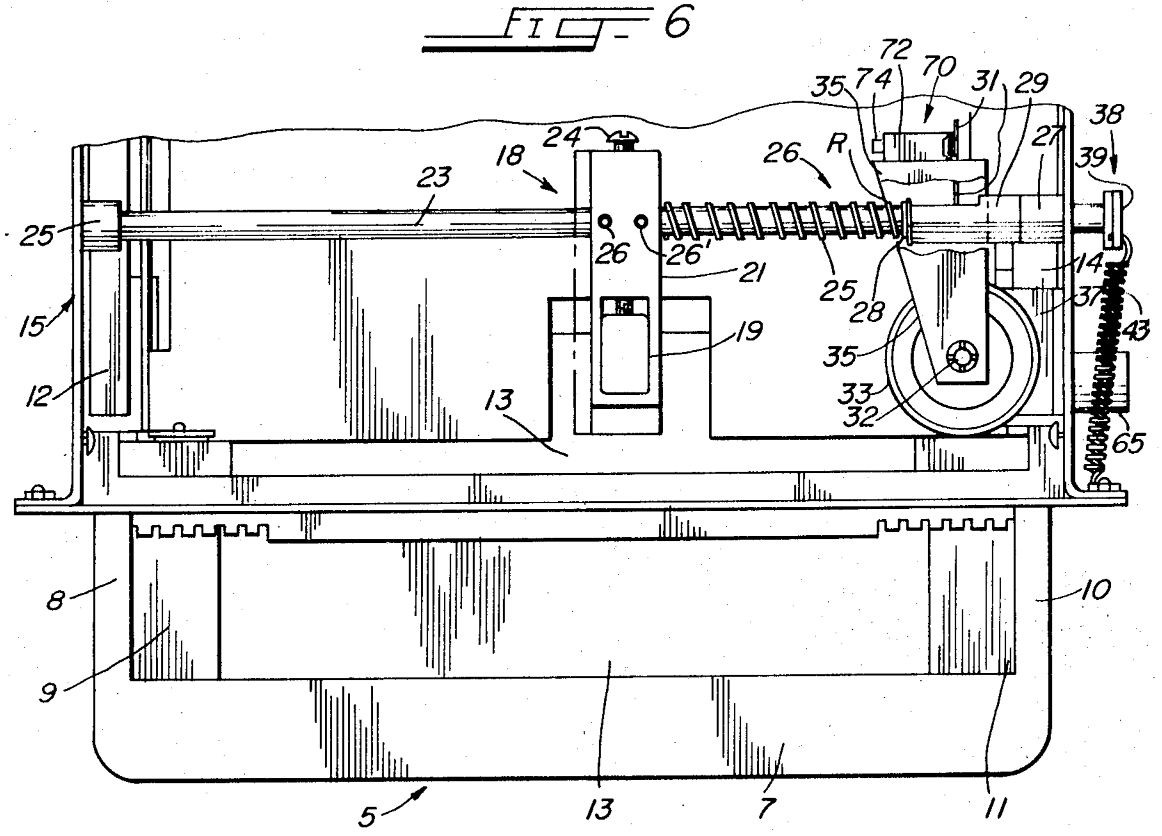
FIG. 6 is a fragmentary, top plan view of the preferred form of the invention shown in association with other document validating apparatus.

As best seen in FIGS. 1 and 6, tray 5 comprises a front bar 7 and a pair of side members 8 and 10. The side members are slidably inserted into a pair of corresponding guide brackets 12, 14, respectively which are in turn mounted on a frame 15. Other portions of tray 5 include a pair of recessed panel members 9, 11 and a transparent insert 13 made of glass or the like on which a test document may be placed.

As best shown in FIGS. 1 and 6, scanning assembly 18 comprises a scanning head 19, including a lower surface 20, which is attached to a mounting block 21 by a screw 24. The mounting block is in turn securely mounted on a shaft 23 by set screws 26, 26' whereby the entire scanning assembly is compelled to rotate therewith. Shaft 23 is journaled at its left-hand end (as shown in FIG. 6) for rotation in frame 15 by means of a bearing 25 and is similarly journaled for rotation at its right-hand end by a bearing 27.

Figures 7, 8:
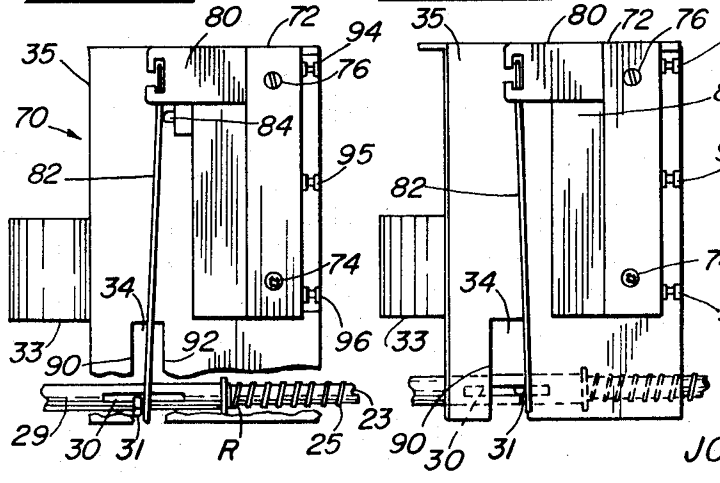
FIG. 7 is a fragmentary, rear elevational view of a portion of the invention in a particular phase of operation.
FIG. 8 is a rear elevational view of the apparatus shown in FIG. 7 in another phase of operation.

As best seen in FIGS. 6–8, drive mechanism 26 is mounted on shaft 23 between mounting block 21 and bearing 27. Drive mechanism 26 includes a spring 25 which is wound around shaft 23 and has a left-hand end L mounted against mounting block 21 and a right-hand end R mounted against a washer 28. Washer 28 bears against a slotted sleeve 29 which inturn abuts bearing 27. Mounted through a slot 30 in sleeve 29, and securely attached to shaft 23, is a drive member 31. The free end of drive ember 31 extends through a slot 34 of a bracket 35 which is in turn rigidly attached to a rotor 32 of a control dash pot 33. The dash pot is secured to frame 15 by a bracket 37. In a well-known manner, the dash pot supplies an adjustable force to bracket 37 during the scanning cycle of operation.

Referring to FIGS. 1–6, cam follower assembly 38 comprises a lever 39, which is mounted at the right-hand end of shaft 23 (as viewed in FIG. 6) for rotation therewith, and includes a first surface 40 and a second surface 40'. A return spring 43 has one end connected to an eyelet 41 located in the upper portion of the lever, and a second end attached to a mounting lug 45 which is connected to frame 15 by a screw 44. Thus, spring 43 biases lever 39 and shaft 23 in a counterclockwise direction (as viewed in FIG. 1), so that scanning head 19 will tend to be urged into close contact with a test document positioned on transparent insert 13.

Cam assembly 53 preferably comprises a unitary plastic body having a plurality of cam surfaces including a lever rest surface 57, a scan impeding surface 59, a scan stop surface 61, a return surface 63, and a pair of disengaging surfaces 60, 67. The described cam surfaces are adapted to coact with lever 39 and control the movement of scanning head 19 in response to movement of tray 5. Assembly 53 is securely attached to side member 10 of tray 5 via mounting screws 62, 64 and is slidably movable in a slot 55 in the direction indicated by arrow A in FIG. 1.

A blocking pin 65 is fixed to frame 15 by a hexhead screw 66 in order to prevent excessive movement of the lever and will be explained in more detail hereinafter.

A return spring 47 is connected at its first end to a mounting screw 49 on frame 15 and is connected at its opposite end to a mounting screw 51 on cam assembly 53. A left-hand slidable member (not shown) is fixed to the edge of tray 5 adjacent member 8 and is adapted to ride in a slot (not shown) in the left-hand side of frame 15 corresponding to slot 55. A left-hand spring (not shown) similar to spring 47 is anchored between frame 15 and the end of the slidable member near the rear of frame 15. Both spring 47 and the left-hand spring cooperate to urge tray 5 toward its extended position shown in FIG. 1.

As best seen in FIGS. 6–8, scanning switch assembly 70 comprises a switch body 72 which is securely mounted to bracket 35 by screws 74 and 76. It will be remembered that bracket 35 is in turn connected to the rotor of dashpot 33 which controls the rate at which the scanning head moves during the scanning phase of operation. Extending from the switch body are electrical terminals 94–96 which are connected to scanning head electrical circuitry (not shown). Also included in scanning switch assembly 70 is a resilient lever arm 82 which is connected to the switch body by a hinge member 80. The lever arm is arranged adjacent a switch contact 84, the position of which determines whether the switch is in its on or off condition. The lever arm is also positioned adjacent the right-hand edge of drive member 31 (as seen in FIGS. 7 and 8). Normally, the placement and resilient nature of the lever arm is such that bracket 35 is urged to the right (as seen in FIG. 7). Under such conditions, the drive member is normally positioned adjacent edge 90 of slot 34 (FIG. 7), and the switch contact is placed in its off condition. However, when the scanning head 19 is moved during the scanning phase of operation, the drive member (which is attached to the scanning head through shaft 23) will force the lever arm to a position adjacent edge 92 of slot 34, as shown in FIG. 8, and momentarily place the switch contact in its on condition.

Tray switch assembly 100 comprises a mounting block 102 which is rigidly attached to cam assembly 53 and may be molded as an integral portion thereof. The switch assembly also includes a detent member 104 which is hinged to block 102 by a rod 106. Also mounted to block 102 at the lower end thereof is a U-shaped latch 108 which is held in position by pins 109, 111 and is adapted to comate with detent member 104. Preferably latch 108 comprises a permanent magnet which is normally capable of attracting and holding detent member 104, which is preferably formed of a ferromagnetic material, to the surface thereof. Also included in the switch assembly is a mass 110 which is movably mounted to frame 15 by a bolt 112 and positioned by a rod 113. A switch body 114 is located adjacent the mass and detent member and is secured to frame 15 by mounting screws 116 and 118.

Figures 4, 5:
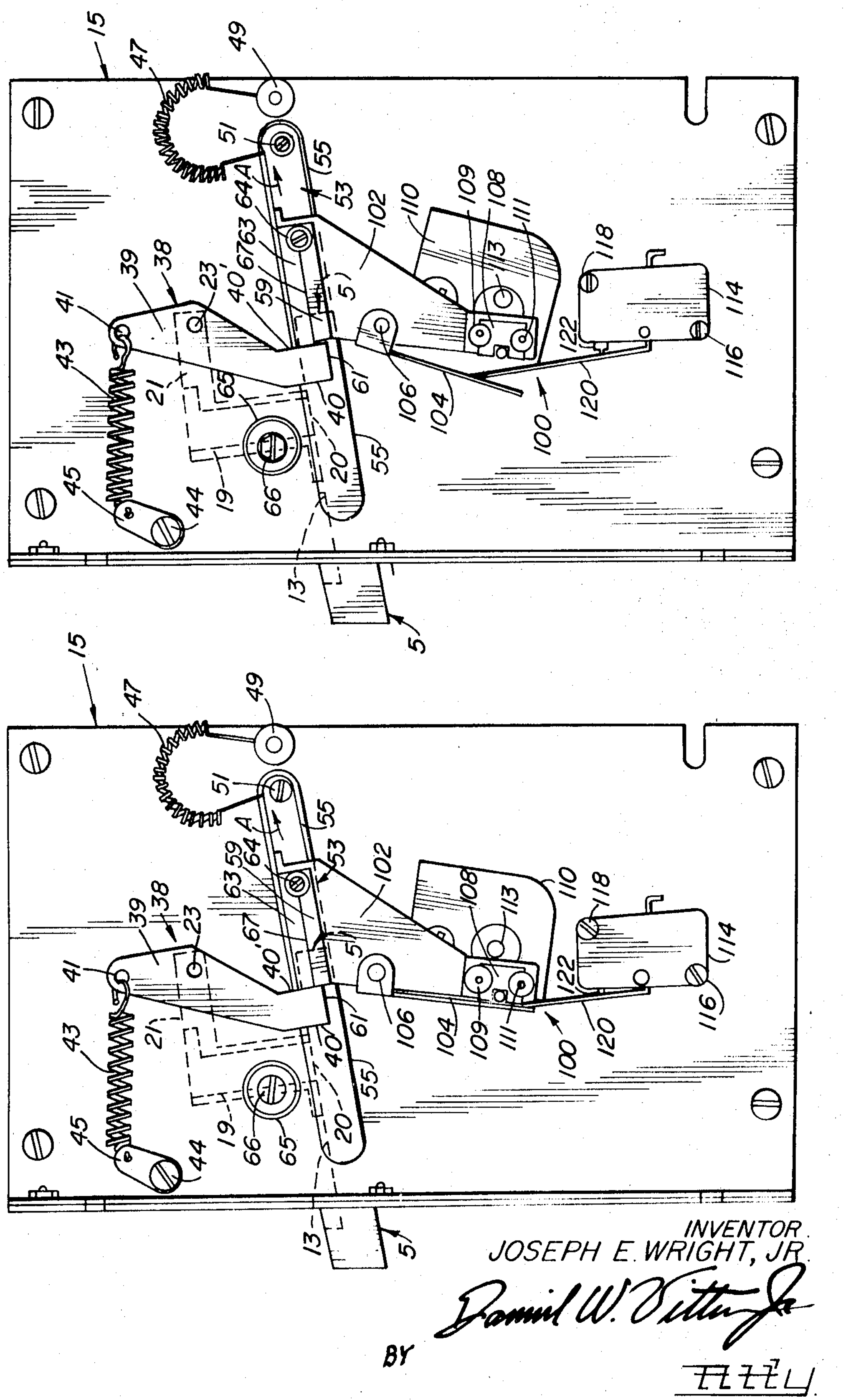
FIG. 4 is a side elevational view of the parts shown in FIG. 1 during a particular phase of operation.
FIG. 5 is another side elevational view of the parts shown in FIG. 1 during another phase of operation.

Extending from the switch body is a resilient lever arm 120 which is located in the operating path of detent member 104. The lever arm controls the position of a switch contact 122 which in turn determines whether the switch is in its on or off condition. As the tray is inserted into frame 15, detent 104 is normally attracted to the surface of latch 108 and moves the switch contact 122 to its on position through the operation of lever arm 120 (FIG. 4). In this condition switch contact 22 completes an electrical circuit which enables the performance of a validation test. However, when the tray is inserted at a speed exceeding a predetermined rate, the magnetic attraction between the detent member and the latch is broken, and the detent assumes the position shown in FIG. 5. Under these circumstances switch contact 122 is in its off condition, and the validating apparatus is disabled.

The operation of the preferred embodiment of the present invention will now be described in detail. When tray 5 is in its extended position (as shown in FIG. 1), lever 39 has its surface 40′ resting against the top edge of cam surface 57. When lever 39 is in the position shown, the lower surface 20 of scanning head 19 (shown in dotted lines in FIG. 1) is maintained in a reset plane located above transparent insert 13 in tray 5, thereby allowing a test document to be easily inserted in tray 5. It should be also noted that spring 43 is slightly extended and is adapted to urge lever 39 to rotate in a counterclockwise direction (as shown in FIG. 1.

After a test document has been positioned on insert 13, tray 5 may be pushed inwardly into the test area. As the tray is progressively moved into frame 15, the attached cam assembly 53 (and the corresponding left-hand slidable member located opposite assembly 53) are moved in their respective slots in the direction indicated by arrow A (FIG. 1). As soon as assembly 53 is moved inward, lever 39 is revolved in a counterclockwise direction in response to the urging of spring 43 and assumes a position in which its surface 40′ is flush against surface 57 of cam assembly 53. As a result of the foregoing motion, the lower surface 20 of the scanning head is rotated, by the movement of shaft 23, into a scanning plane adjacent the upper surface of the test document (i.e., adjacent insert 13). As assembly 53 continues to be moved inwardly, lever 39 slides along scan impeding surface 59 toward the position shown in FIG. 2.

When the tray 5 is moved to its fully inserted position in frame 15, lever 39 will have moved to a position beyond the edge of surface 59 and will, at that point, be urged toward scan stop surface 61 along a path approximately parallel to scan disengaging surface 60 (i.e., in a direction shown by an arrow B in FIG. 2). The motive power which moves lever 39 and shaft 23 along the described path is furnished by drive mechanism 26. That is, spring 25 urges scanning head 19 from the position shown in full lines in FIG. 6, to a position to the left thereof shown in broken lines. Thus, as soon as lever 39 is extended beyond the end of cam surface 59, mounting block 21 and attached scanning head 19 are driven by spring 25 across the test area of the test document. This scanning movement continues until lever 39 engages scan stop surface 61 (FIGS. 3 and 4), and the scanning head is brought to rest in the position shown in broken lines in FIG. 6, thereby ending the scanning phase of operation.

As previously explained, shaft 23 is connected through drive member 31 and bracket 35 to the rotor of the dash pot 33 which controls the precise rate at which scanning head 19 moves across the test area. Dash pot 33 is adjustable so that a variety of predetermined uniform scan rates may be used. For example, the dash pot may be adjusted to provide a uniform scan velocity across most of the test area after a brief initial period of acceleration. In other cases, the dash pot may be adjusted to provide a predetermined rate of change of velocity (i.e., acceleration) across the entire test area. It should be noted that scanning head 19 can perform a validation test when it is moved at a predetermined rate of acceleration or velocity, although the validation circuitry used in either case will, of course, be somewhat different. Accordingly, as used herein, the term "rate" is intended to refer to both acceleration and velocity.

A uniform, predetermined rate of scan is ensured by a number of cooperating elements. Thus, the scan rate is independent of the speed at which the tray is inserted, sine the scanning phase of operation is not begun until lever 39 extends beyond the scan impeding surface 59 of assembly 53 (i.e., until tray 5 is moved to its fully inserted position in frame 15, and the test document is beyond the control the operator). Moreover, it will be noted that the scan rate is determined solely by the operation of spring 25 and dash pot 33, and that no electric motors or elaborate servomechanisms are required for optimum performance of the invention.

Another aspect of the present invention which ensures accurate validation of documents involves the unique use of scanning switch assembly 70. As best seen in FIG. 7, the switch assembly includes a resilient lever arm 82 which is normally in the position shown in FIG. 7. In such a position, switch contact 84 is in its off condition, whereby the validation apparatus (not shown) is disabled. As tray 5 is inserted into frame 15, lever arm 82 will remain in the position shown in FIG. 7 until lever 39 is extended beyond the end of cam surface 59, and shaft 23 and the scanning assembly are free to move across the test area. Also, as the tray is inserted, shaft 23 is rotated slightly so that only the end portion of the drive member is visible in a rear view such as FIGS. 7 and 8. At the beginning of the scanning phase of operation, spring 25 begins to move shaft 23 in the direction indicated by arrow C (FIG. 8), and drive member 31 (which is attached to shaft 23) drives lever arm 82 to a position adjacent side 92 of slot 34 (FIG. 8). In such a position, switch contact 84 completes an electrical circuit which enables the validating circuitry to operate. Drive member 31 will remain in the position shown in FIG. 8 during the entire scanning phase of operation. However, when the scanning head comes to rest in the position shown in broken lines in FIG. 6, resilient lever arm 82 will move bracket 35 to the right (as seen in FIG. 8) so that the switch contact will again be placed in a position adjacent side 90 of slot 34. In such a position, contact 84 will again be in its off condition, and the validating circuitry will be disabled. As a result, signals which are not received by the scanning head during the scanning phase of operation will have no effect on the validating apparatus.

If the scanning of the document indicates that it is genuine, the tray is secured in its inserted position and the document is removed from the test area by conventional means (not shown). If the document appears to be counterfeit, the removal means are not activated and the document remains on transparent insert 13 of tray 5. After a genuine document has been removed, tray 5 is freed and may be returned to its initial extended position under the urging of spring 47 and the corresponding spring (not shown) on the left-hand side of frame 15.

Figure 3:
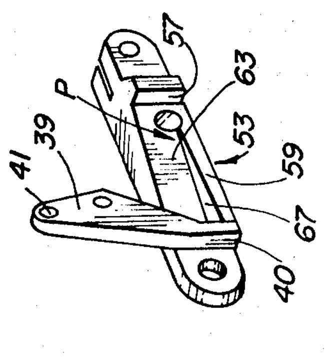
FIG. 3 is an enlarged perspective view of the parts illustrated in FIG. 2 during another phase of operation.

As noted previously, at the end of the scanning phase of operation, lever 39 is held by scan stop surface 61 as shown in FIG. 3. When assembly 53 is moved from its fully inserted position along slot 55 in a direction opposed to the direction of arrow A (FIG. 1), surface 40' of lever 39 is engaged by disengaging surface 60 of assembly 53 and is pivoted in a clockwise direction (as shown in FIG. 1). This rotational movement causes the lower surface 20 of scanning head 19 to move upwardly away from its position in the scanning plane to its position in the rest plane (as shown in dotted lines in FIG. 1). Blocking pin 65 is positioned to prevent lever 39 from rotating too far in a clockwise direction if assembly 53 is rapidly returned. Lever 39 then rides along scan disengaging surface 67 as the tray is progressively moved toward its extended position.

As tray 5 proceeds toward its extended position, lever 39 is cammed outwardly by return surface 63 and, at about point P (FIG. 3), surface 67 becomes so narrow that lever 39 is forced outwardly therefrom and is rotated into position flush against cam surface 57 by the urging of spring 43. In such a position, lower surface 20 of the scanning head is briefly returned to a position near the scanning plane (i.e., near insert 13). However, as the trays is moved to its fully extended position, lever 39 assumes the position shown in FIG. 1, and lower surface 20 is again into a position in the rest plane (FIG. 1).

Another feature of the present invention which prevents generation of a spurious validation signal by mechanical shock results from the unique operation of the tray switch assembly 100. Since the rate of movement of tray 5 is uncontrolled by the validating device, severe mechanical shock may result if an operator moves the tray rapidly into its fully inserted position. Such mechanical shock may result in a spurious electrical signal which may, in turn, tend to generate a false validation signal in the validating apparatus. In order to eliminate the possibility of such an occurrence, the tray switch assembly is designed to disable the validating apparatus if the tray is inserted at a speed exceeding a predetermined rate. As previously described, the tray switch assembly includes a magnetic latch 108 which normally attracts a detent 104 to the surface thereof. A mass 110 and a resilient lever arm 120 are located in the operating path of the detent and are arranged to make contact with the detent before the tray reaches its fully inserted position. When the tray is inserted at a normal rate of speed, the force exerted on the detent by contact with the lever arm and mass is insufficient to disengage the detent from the surface of latch 108, and the mass and lever arm are moved to the positions shown in FIG. 4. When the switch assembly is in its engaged position as shown in FIG. 4, the switch contact 122 is in its on condition and the validating apparatus is allowed to operate in a normal manner. However, if the tray is inserted at a speed exceeding a predetermined maximum, the inertia of the mass, as it strikes the detent, is sufficient to disengage the detent from the surface of the latch. Thus, when the tray has been rapidly moved to its fully inserted position, the detent and lever arm will be in the positions shown in FIG. 5, and the switch contact will remain in its off condition. As a result, the validating apparatus will remain inoperative and prevent any mechanical shock resulting from the rapid insertion of the tray from producing a spurious validating signal. When the tray is returned to its fully extended position, the latch will magnetically attract the detent to the surface thereof, and the parts will assume their engaged positions shown in FIG. 1.

From the foregoing description it is believed obvious that the scan operation and switching functions designed to prevent false validation are accomplished by wholly mechanical means without the need for expensive and bulky electric motors and control systems. The unique camming arrangement described above has a degree of reliability and simplicity heretofore unknown in validators and provides a simple and accurate method for controlling the rate at which scanning occurs. The switching apparatus provides an inexpensive and precise means for preventing electrical signals from activating the validating circuit except during the scanning operation and for preventing false validation by mechanical shock. It should be understood that the present invention is not limited to the precise embodiment described, but is meant to include various modifications which will be apparent to one skilled in the arts. For example, the scanning head spring drive mechanism cam be replaced with other spring drive arrangements, and the cam assembly can be designed to remain stationary while the lever moves over the surfaces thereof. Moreover, the various switching assemblies can be rearranged into a number of configurations without departing from the spirit and the scope of the present invention.

Likewise, while the described arrangement of cams and drive mechanism is designed to perform a scanning test on the initial lateral movement of the scanning head, it should be understood that the apparatus could be so arranged to permit scanning to occur on the return movement of the scanning head. That is, the scanning head could be initially cammed to one position and driven back to its first position at a predetermined rate of speed. Also, while movement of a scanning head relative to a document has been described specifically, the present invention may be easily arranged to provide uniform movement of a test document relative to a fixed scanning station.

It should be further understood that the embodiment described is merely exemplary of the preferred practices of the present invention and that various changes, modifications, and variations may be made in the arrangements, operations, and details of construction of the foregoing disclosure, without departing from the spirit and scope of the present invention, as defined in the appended claims.

1. In a validation device adapted to perform an authentication test on a test document by scanning at least a predetermined portion thereof, the improvement comprising:

document carrier means for moving the test document from a first position to a test position, the document carrier being held stationary in the test position during the authentication test;

scanning means movable between a first position and a second position in a first plane;

cam follower means operatively associated with the scanning means;

drive means adapted to cause the scanning means to move from its first to its second position in a predetermined manner to scan at least a predetermined portion of the test document at a predetermined uniform rate;

first cam means operatively associated with the document carrier means and adapted to coact with the cam follower means, whereby the scanning means is normally maintained in its first position and is permitted to move from its first to its second position after the document carrier means reaches its test position;

means adapted to urge the document carrier means toward its first position; and second cam means adapted to coact with the cam follower means, whereby movement of the document carrier means from its test position toward its first position causes the scanning means to move from its second position toward its first position.

2. An improvement, as claimed in claim 1, and further comprising means for rendering a test document inaccessible to an operator when the document is disposed on the document carrier means and the document carrier means is moved toward its second position.

3. An improvement, as claimed in claim 1, and further comprising control means for controlling the rate at which the drive means causes the scanning means to move from its first to its second position in the first plane.

4. An improvement, as claimed in claim 3, wherein the drive means comprises a spring and wherein the control means comprises a dashpot operatively associated with the scanning means for controlling the rate of movement thereof between its first and second positions in the first plane responsive to the urging of the spring.

5. In a validation device adapted to perform an authentication test on a test document by scanning at least a predetermined portion thereof, the improvement comprising:

document carrier means for moving the test document from a first position to a second position;

scanning means movable between a first position and a second position in a first plane and between the first plane and a second plane;

cam follower means operatively associated with the scanning means;

drive means adapted to cause the scanning means to move from its first to its second position in a predetermined manner;

first cam means operatively associated with the document carrier means and adapted to coact with the cam follower means, whereby the scanning means is normally maintained in its first position and is permitted to move from its first to its second position after the document carrier means reaches its second position;

means adapted to urge the document carrier means toward its first position;

second cam means adapted to coact with the cam follower means, whereby movement of the document carrier means from its second position towards its first position causes the scanning means to move from its second position toward its first position;

means normally urging the scanning means toward the first plane and away from the second plane;

third cam means adapted to normally maintain the scanning means in the second plane and, responsive to movement of the document carrier means from its first position toward its second position, to permit the scanning means to move from the second plane to the first plane; and fourth cam means responsive to movement of the document carrier means from its second position toward its first position for causing the scanning means to move from the first plane to the second plane.

6. An improvement, as claimed in claim 5, wherein the scanning means is movable from the first plane to the second plane along an arcuate path, the scanning means being movable from its first position to its second position in the first plane along a linear path.

7. An improvement, as claimed in claim 5, and further comprising means for preventing the scanning means from moving to a position beyond the second plane when the scanning means is moved from the first plane toward the second plane by the fourth cam means.

8. An improvement, as claimed in claim 5, wherein the cam follower means includes side and end surfaces on a lever movable with the scanning means, and wherein the first, second, third, and fourth cam means comprise respective surfaces of a unitary cam assembly operatively associated with the document carrier means.

9. An improvement, as claimed in claim 8, wherein the first cam means is defined by a plane generally parallel to the direction of movement of the document carrier means, the second cam means is defined by a plane which is generally skewed with respect to the direction of travel of the document carrier means, and the third and fourth cam means are defined by planes generally perpendicular to the plane of the first cam means and are located adjacent opposite ends of the first cam means.

10. In a validation device adapted to perform an authentication test on a test document by scanning at least a predetermined portion thereof, the improvement comprising:

scanning means movable between a first position and a second position;

a movable bracket;

a slot located in the movable bracket, said slot having a first side and a second side;

a drive member extending through the slot, said drive member being operatively connected to the scanning means;

a resilient lever arm having first and second ends, said lever arm operatively connected adjacent its first end to the bracket and positioned adjacent its second end in contact with the drive member, whereby the bracket is biased so that the first side of the slot is positioned adjacent the drive member when the scanning means is at rest, and whereby the bracket is moved so that the second side of the slot is positioned adjacent the drive member when the scanning means is being moved from its first to its second position; and a switch contact positioned adjacent the resilient lever arm and operated by the movement of the lever arm as the drive member moves from its position adjacent the first side of the slot to its position adjacent the second side of the slot, whereby the validation device is enabled to perform an authentication test only while the scanning means is moving from its first position to its second position.

11. In a validation device adapted to perform an authentication test on a test document submitted by an operator, the improvement comprising:

document carrier means adapted to move the test document from a first position to a second position responsive to operator activation;

detent means carried by the document carrier means and having an engaged position and a disengaged position;

releasable latch means carried by the document carrier means, whereby the detent means is normally held in its engaged position;

movable mass means positioned in the operating path of the detent means, whereby the detent means is moved from its engaged to its disengaged position by contact with the mass means when the document carrier means is moved from its first toward its second position at a speed exceeding a predetermined rate; and switch means adapted to prevent the completion of an authentication test when the latch means is moved to its disengaged position by contact with the mass means.

12. An improvement, as claimed in claim 11, wherein the switch means is positioned so that the validation device is enabled to perform an authentication test when the detent means remains in its engaged position after said detent means has come in contact with the movable mass means in response to the movement of the document carrier means from its first toward its second position.

13. An improvement, as claimed in claim 12, wherein the releasable latch means comprises a permanent magnet, and the detent means comprises a ferromagnetic material.

14. In a validation device adapted to perform an authentication test on a test document received from an operator by scanning at least a predetermined portion thereof, the improvement comprising:

document carrier means for moving the test document from a first position to a second position responsive to operator actuation;

scanning means movable between a first position and a second position;

cam follower means operatively associated with the scanning means;

drive means adapted to cause the scanning means to move from its first to its second position in a predetermined manner;

first cam means adapted to coact with the cam follower means, whereby the scanning means is normally maintained in its first position and is permitted to move from its first to its second position after the carrier means reaches its second position;

means normally urging the carrier means toward its first position;

second cam means adapted to coact with the cam follower means, whereby movement of the carrier means from its second toward its first position causes the scanning means to move from its second toward its first position;

first switch means operatively associated with the scanning means, whereby the validation device is enabled to perform an authentication test only while the scanning means is moving from its first position to its second position;

detent means carried by the document carrier means and having an engaged position and a disengaged position;

releasable latch means carried by the document carrier means, whereby the detent means is normally held in its engaged position;

movable mass means positioned in the operating path of the detent means, whereby the detent means is moved from its engaged to its disengaged position by contact with the mass means when the document carrier means is moved from its first toward its second position at a speed exceeding a predetermined rate; and second switch means adapted to prevent the completion of an authentication test when the latch means is moved to its disengaged position by contact with the mass means.

15. An improvement, as claimed in claim 14 wherein the first switch means comprises:

a switch contact normally biased in a first position, said switch contact also being movable to a second position;

a resilient switch lever operatively associated with the switch contact, whereby the switch contact is moved from its first to its second position in response to movement of the switch lever from its first to its second position; and a drive member operatively connected to the scanning means and positioned adjacent the resilient switch lever, whereby the resilient switch lever is moved from its first to its second position when the scanning means is moving from its first position to its second position.

16. In a validation device adapted to perform an authentication test on a test document by scanning at least a predetermined portion thereof, the improvement comprising:

document carrier means for moving the test document from a first position to a test position said document carrier being held stationary in said test position during the authentication test;

scanning means movable between a first position and a second position;

drive means being actuated upon said document carrier means reaching its test position as a result of movement from its first position, said drive means causing said scanning means to move from its first to its second position in a predetermined manner to scan at least a predetermined portion of the test document at a predetermined uniform rate;

means urging said document carrier means from its test position toward its first position; and means causing said scanning means to move from its second position toward its first position upon movement of said document carrier means from its test position toward its first position.

17. An improvement, as claimed in claim 16, and further comprising switch means operatively associated with the scanning means, whereby the validation device is enabled to perform an authentication test only while the scanning means is moving from its first position to its second position.

18. An improvement, as claimed in claim 17, wherein the switch means comprises:

a switch lever normally biased in a first position, said switch lever also being movable to a second position;

a movable switch contact positioned adjacent the switch lever, whereby the switch contact is operated when the switch lever is moved between its first and second positions; and a drive member operatively connected to the scanning means and positioned adjacent the switch lever, whereby the switch lever is moved to its second position when the scanning means is moving from its first position to its second position, and the switch lever is thereafter returned to its first position.